US005092722A

United States Patent [19]

Reazer, III et al.

[11] Patent Number: 5,092,722

[45] Date of Patent: Mar. 3, 1992

[54] AUTOMATICALLY ADAPTABLE FASTENING SYSTEM FOR WHEELED COTS AND SIMILAR DEVICES

[75] Inventors: George M. Reazer, III, Lebanon; Irvin D. Pollock, Wilmington; Aristethes A. Lambros, Blanchester; Jerry L. Taylor, Greenfield, all of Ohio

[73] Assignee: Ferno-Washington, Inc., Wilmington, Ohio

[21] Appl. No.: 696,638

[22] Filed: May 7, 1991

[51] Int. Cl.$^5$ .................................... B60P 7/08

[52] U.S. Cl. .................................... 410/104; 248/503.1; 296/20; 410/8

[58] Field of Search .................... 296/20, 65.1; 410/8, 410/104, 105; 248/503.1, 503; 5/82 R

[56] References Cited

U.S. PATENT DOCUMENTS

| | | | |
|---|---|---|---|
| 3,869,144 | 3/1975 | Cwycyshyn et al. | 410/8 |
| 4,257,644 | 3/1981 | Stephens | 296/65.1 |
| 4,457,551 | 7/1984 | Anthony | 296/65.1 |
| 4,496,271 | 1/1985 | Spinosa | 410/105 |
| 4,688,843 | 8/1987 | Hall | 296/65.1 |
| 4,690,364 | 9/1987 | Constantin | 248/503.1 |

OTHER PUBLICATIONS

Selected pages from an Advertising Catalog of Ferno-Washington, Inc. entitled Emergency Patient Handling Equipment, pp. 35-52.

*Primary Examiner*—Robert R. Song
*Attorney, Agent, or Firm*—Frost & Jacobs

[57] ABSTRACT

A fastening system for emergency vehicle cots and the like includes a longitudinal guide track to be mounted upon the planar surface. At least one hold-down support depends downwardly from the support frame of the cot to be secured, extending toward the planar surface in use. The guide track receives the hold-down support to permit longitudinal movement of the support along the track while preventing substantial vertical movement. A lock is provided for automatically securing the support frame at a position along the track and to prevent further longitudinal movement therealong, and a release device for selectively disengaging the lock is also included. In a preferred embodiment, the fastening system further includes a pair of spaced apart supports, and the lock includes a plurality of locking gates spaced along the length of the guide track to receive and selectively lockingly interact with the supports. The locking gates can be specifically designed to engage only with supports having a predetermined structural conformation. In this way, the locking gates provide for automatic adaptability of the system to a variety of different cot models without requiring structural alterations.

18 Claims, 6 Drawing Sheets

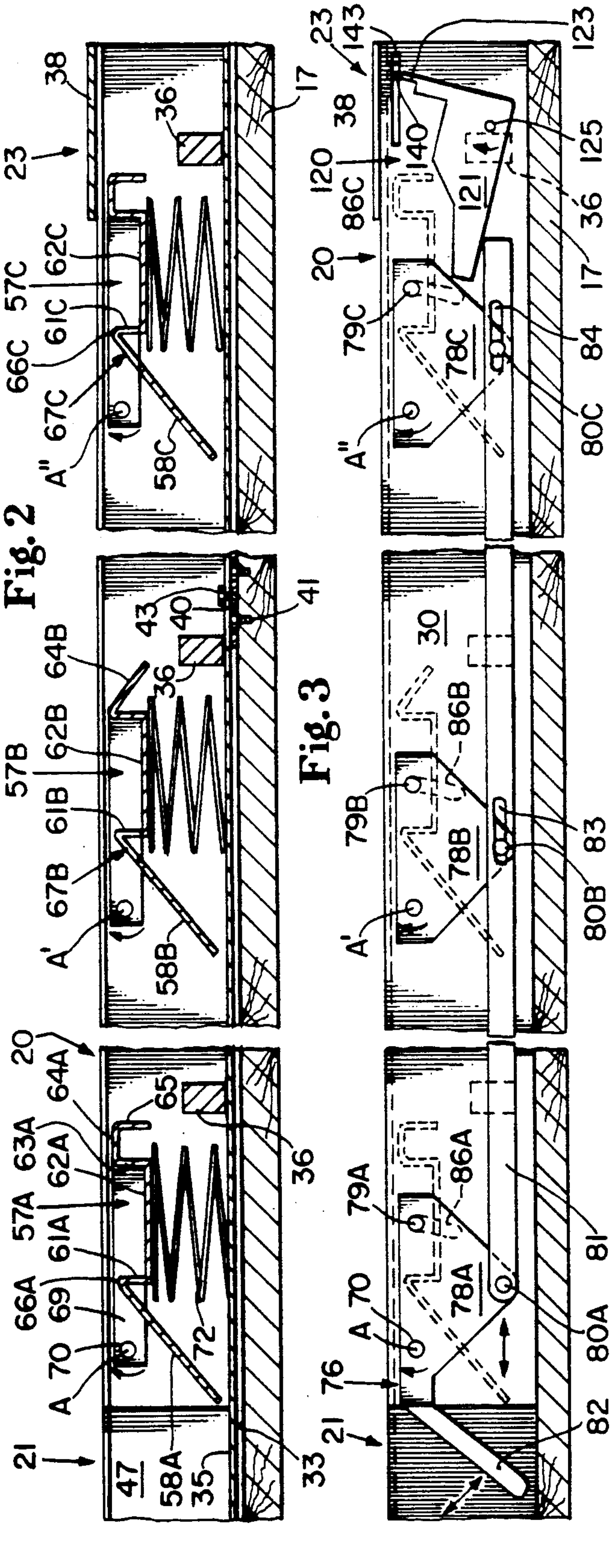
Fig. 2
Fig. 3
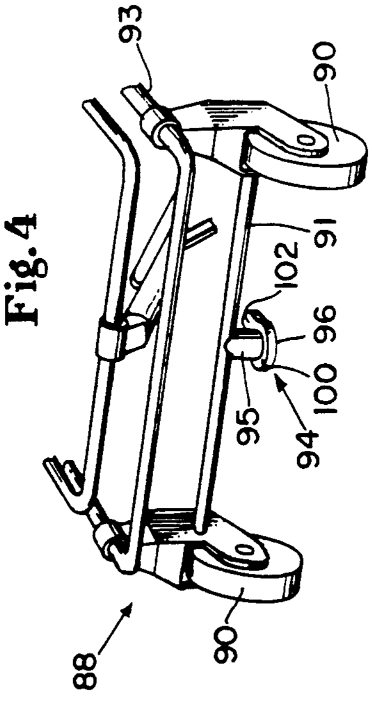
Fig. 4
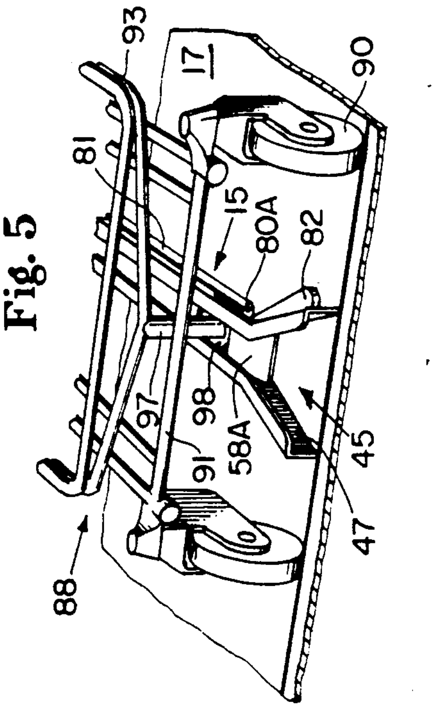
Fig. 5

AUTOMATICALLY ADAPTABLE FASTENING SYSTEM FOR WHEELED COTS AND SIMILAR DEVICES

TECHNICAL FIELD

This invention relates to fastener systems for securing cots or similar wheeled devices for storage, transportation or the like, and, more particularly, to an improved fastening system for securing an ambulance cot or similar wheeled emergency device into a vehicle for safe and dependable transportation and storage, wherein such fastening system provides improved securement of the wheeled device under all conditions of use and automatically accepts a variety of wheeled devices without a need for alterations or adjustments.

BACKGROUND ART

In ambulances and other emergency/rescue vehicles, removable, wheeled cots or stretchers are often provided for convenient and comfortable patient transportation from a remote accident site to the emergency vehicle. These cots or stretchers are often referred to as "roll-in" devices, and generally feature a plurality of wheels for inserting and removing the cot from the emergency vehicle, as well as an adjustable or multilevel fold down carriage supporting a set of wheels which enables the cot to be easily rolled along sidewalks, roads, or other access surfaces.

The mobile patient transportation cots or similar devices commonly include a structural frame, which is often tubular in nature, to provide lightweight support for the patient and the wheels, casters or other rolling mechanisms attached thereto. Once the patient is rolled to the emergency vehicle on the cot, the undercarriage may be collapsed and folded under the cot to facilitate insertion of the cot into the emergency vehicle. The cot is then rolled into the emergency vehicle and fastened into position for safe transportation.

A cot fastener system comprising a front member often referred to as an "antler" bracket, and a rear fastening rail has been widely used in the industry for a number of years. Particularly, the front bracket generally includes a pair of upwardly . extending hook-like members which curve to the rear of the emergency vehicle and are designed to receive and effectively hook onto portions of the forward support frame members of the cot. This bracket thereby limits forward movement of the cot within the emergency vehicle. A separate rear fastening rail is thereafter secured to the cot frame to secure the cot against further rolling movement within the emergency vehicle.

While such cot fastener systems have been widely and successfully used, there are a plurality of designs for cots and other wheeled devices utilized in various emergency vehicles and the like, and interchangeable use of prior cot fastener systems often required modification of the fastener system itself or its installation, or adjustments to the system. A fastener system which could accommodate a broad range of cot models and which could automatically and dependably accept and function properly with those various models without modifications or adjustments has heretofore been unavailable in the industry.

Some cot fastener systems which function in the manner described above also feature only limited abilities to maintain the secure position of the wheeled device when subjected to violent jarring and/or impact forces sometimes encountered in use, such as sudden lurches, stops, collision impacts or rollovers. Such hazards are encountered, for example, by ambulances or other emergency vehicles with varying degrees of frequency. It has been found that some prior cot fastener systems do not prevent a "secured" cot from extending away from the floor of an ambulance during rollover accidents as a result of the folded under-carriage unfolding and/or the antler bracket or rear fastener rail being unable to support the sudden stresses exerted in such a situation.

Similarly, while the cot fastener systems are often well designed to resist forces tending to urge the cot in a forward direction during sudden stops and the like, such systems are often unable to maintain the cot in secured position when the vehicle is subjected to a sudden force from behind, such as a rear-end collision. As can be understood, in situations where the cot and its fastener systems are subjected to sudden impact force,,it is clear that any inability of the fastener system to maintain the cot in a secure fashion can endanger the health and well being of any patient riding on the cot and other persons and property surrounding the cot both within and without the emergency vehicle. An unsecure cot could obviously injure other passengers within the vehicle or, in some cases, be thrown from the vehicle injuring property or persons outside of the vehicle.

Consequently, while there have been available cot fastener systems which can be adapted to function well with the wide variety of cots commonly utilized in the industry, there has heretofore not been available a single fastener system which provides automatic adaptability to a plurality of commonly encountered cot models, and can also provide enhanced securement characteristics for withstanding the assortment of forces and stresses imposed on a fastener system used in dynamic applications such as emergency vehicle and rescue squad applications.

DISCLOSURE OF THE INVENTION

It is an object of this invention to provide an * improved fastening system for cots and similar wheeled devices which provides a single system which can automatically accept a plurality of cots and devices of differing designs, without requiring modifications or installation changes.

It is another object of the present invention to provide an improved cot fastening system for ambulance and other emergency vehicles which provides a substantially universal securement system which will accept a wide variety of commonly available cots without modification of structure or use of the device.

It is yet another object of the present invention to provide an improved fastening system for cots and similar wheeled vehicles which provides increased reliability and safety in securing the cot to a vehicle or the like, and which can better withstand sudden impacts and rollover forces.

It is also an object of the present invention to provide a fastening system for cots which includes a releasable locking system whose structure enables automatic adaptability to a plurality of cot models, and which does not require alteration of the fastening system structure or procedure for use when cot models are switched.

In accordance with one aspect of the present invention, there is provided a fastening system for cots and similar wheeled devices having a support frame and to be secured along a substantially planar surface The fastening system is to include a longitudinal guide track to be mounted upon the planar surface and having front and rear ends. At least one hold down support depends downwardly from the support frame of the cot to be secured, extending toward the planar surface in use. The guide track receives the hold down support so as to permit selective longitudinal movement of the support along the track while preventing substantial vertical movement therebetween. A lock is provided for securing the support frame at a predetermined longitudinal position along the track and to prevent further longitudinal movement therealong, and a release device for selectively disengaging the lock to permit longitudinal movement of the supports along the track is also included.

In a preferred embodiment, the fastening system further includes a pair of spaced apart supports, and the lock includes a plurality of locking gates spaced along the longitudinal length of the guide track to receive and selectively lockingly interact with the supports. The locking gates can be specifically designed to engage only with supports which having a predetermined structural conformation, wherein the locking gates will not lock with supports having non-conforming structures. In this way, the locking gates provide for automatic adaptability of the system to a variety of different model cots.

BRIEF DESCRIPTION OF THE DRAWINGS

While the specification concludes with claims particularly pointing out and distinctly claiming the present invention, it is believed the same will be better understood from the following descriptio taken in conjunction with the accompanying drawings in which:

FIG. 2 is a partial cross-sectional view of the guide track assembly of FIG. 1, taken along line 2—2 thereof;

FIG. 3 is a partial right side elevational view of the guide track assembly of FIG. 1;

FIG. 4 is a partial perspective view of the front end portions of a wheeled emergency cot and illustrating a preferred hold-down support of the present invention;

FIG. 5 is a partial perspective view of the rear-end portions of a wheeled emergency cot, illustrating a hold-down support locked within a guide track assembly of the present invention;

DETAILED DESCRIPTION OF THE INVENTION

Figures 1, 1A:
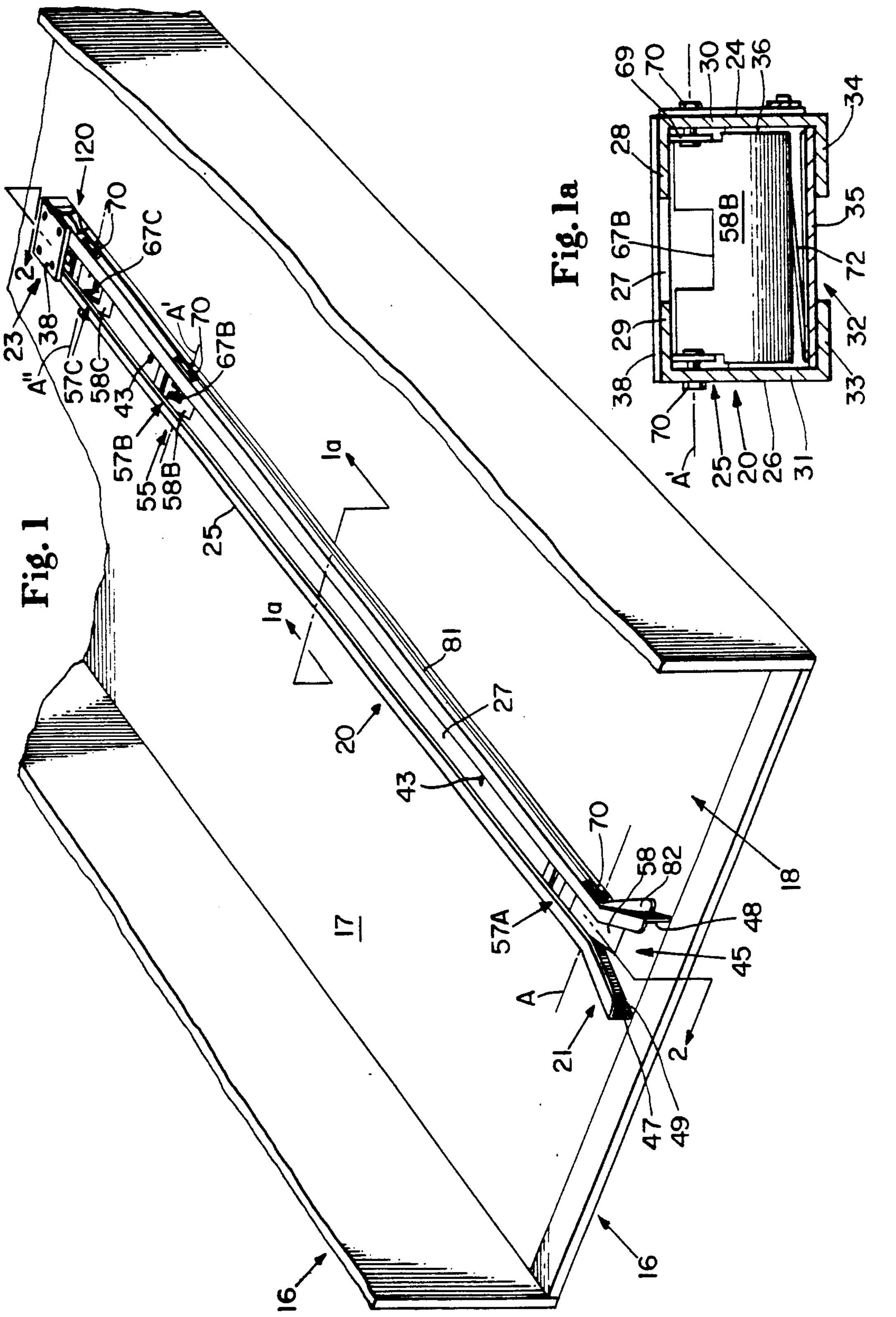
FIG. 1 is a partial perspective view of a preferred guide track assembly of the fastening system of the present invention, illustrated as being mounted within the rear portions of a rescue vehicle.
FIG. 1*a* is a vertical cross-sectional view of the guide track of FIG. 1, taken along line 1*a*–1*a* thereof.

Referring now to the drawings in detail, wherein like numerals indicate the same elements throughout the views, FIG. 1 illustrates a partial perspective view of the rear portions 16 of an emergency vehicle into which a wheeled cot, stretcher or similar patient transfer device is to be placed. While the present invention is applicable to nearly any wheeled device having a support frame and which is to be secured along a substantially planar surface, the present invention will be shown and described in relation to a preferred application of the invention wherein a wheeled emergency cot is to be secured along the floor 17 of an emergency vehicle.

The term "cot" will be understood to refer to any of a variety of patient transfer devices, stretchers, carts or incubator transporters commonly known and utilized in the industry (e.g. Models 29 M, 35-A, 28, 26, 30, 30SC, etc., such as available from Ferno-Washington, of Wilmington, Ohio). Such cots often have a pair of front loading wheels to facilitate insertion and removal of the device from an emergency vehicle, as well as a rear fold-down wheel assembly, including a plurality of wheels to facilitate rolling movement of the cot between the emergency vehicle and other locations. While the cots illustrated and described herein are contemplated as including wheels to facilitate movement of the cot along a planar surface, such wheels could be substituted by other devices such as slides, rollers, skis or the like.

The fastening system 15 of the present invention is contemplated as including a longitudinal guide track 20 having a front end 21 and a rear end 23. As seen best in FIG. 1*a*, guide track 20 is preferably with a generally U-shaped body 25 comprised Provided of a pair of oppositely disposed channels 24 and 26, respectively. Channel 24 further comprises an upper wall 28, side wall 30, and bottom flange 34, and channel 26 similarly comprises upper wall 29, side wall 31, and bottom flange 33.

Because it is preferred that guide track 20 be formed of a corrosion-resistant material such as stainless steel, a bottom plate 35 will preferably be welded along its longitudinal length to the oppositely disposed channels 24 and 26, as shown, to complete the U-shaped body 25. While a single piece U-shaped body might be provided such as by extrusion, forming or molding, the multi-piece arrangement illustrated may be preferred to reduce costs and to simplify manufacturing and assembly procedures.

The open upper portion of U-shaped body 25 forms a longitudinal slot 27 designed to receive and support a pair of downwardly depending hold-down supports (e.g. 95 and 97 of FIGS. 4, 5, and 9), as will be described in greater detail below. As seen best in FIG. 1, front end 21 of guide track 20 is preferably provided with an insertion apron 45 comprising oppositely disposed flared queing surfaces 47 and 48, which can preferably be extensions of sidewalls 30 and 31 of the channel members (24 and 26). As will be seen, insertion apron 45 facilitates preliminary alignment of the downwardly depending supports of fastening system 15 into slot 27 for securement. The front edges (e.g. 49) of the extended portions of upper walls 28 and 29 can also preferably be rounded to facilitate insertion procedures and to minimize safety concerns.

Locking means 55 are preferably provided as part of fastening system 15 for securing the support frame of a wheeled device (e.g. 88) at a predetermined longitudinal position along guide track 20, and for preventing further longitudinal movement of the wheeled device once in locked position. Locking means 55 preferably comprises a plurality of locking gates 57 (illustrated at 57A, 57B and 57C in FIGS. 1 and 2). It has been found that a fastening system 15 including three locking gates 57, as illustrated in FIGS. 1, 2, 3, and 9, can accommodate substantially all commonly available models of emergency vehicle cots in accordance with the present invention and without a need for modifications or adjustments between models.

Figure 6:
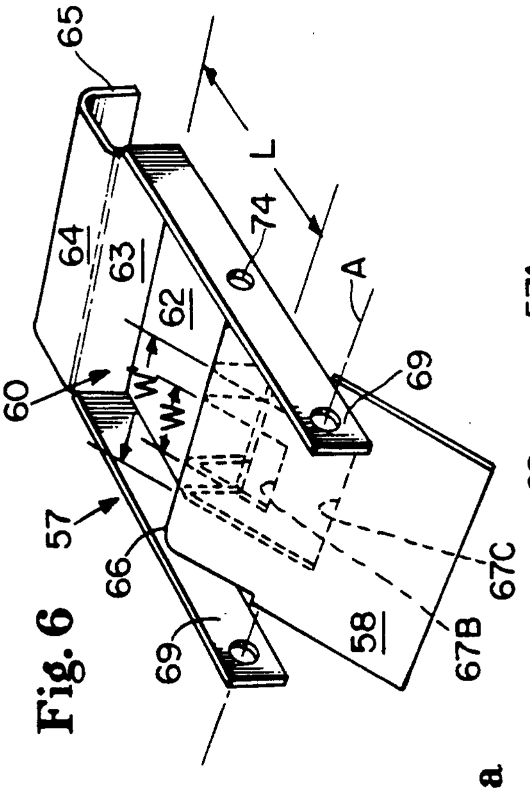
FIG. 6 is a perspective view of a preferred locking gate of the present invention.

As best illustrated in FIG. 6, a typical locking gate 57 preferably comprises an inclined front face 58, upper contact shoulder 66, forward wall 68 (see FIG. 8*a*), recess wall 62, rear face 63, interface panel 64, and downwardly depending rear skirt 65. Extending outwardly from locking gate 57 are a pair of oppositely disposed pivot support tangs 69 which enable the mounting of locking gate 57 along guide track 20 for pivotal rotation about a transverse axis A.

As illustrated in FIGS. 1 and 2, it is contemplated that a plurality of locking gates 57A, 57B, and 57C will be mounted via their support tangs 69 along guide track 20, such as by a pair of oppositely disposed pivot bolts 70. As best seen in FIG. 6, support tangs 69 can be extensions of the side portions of a locking gate (shown as generic gate 57) A second connection point is provided as a release opening 74 to enable the disengagement or release of locking plate 57 from a hold-down support, as will be discussed.

FIG. 6 further illustrates in phantom a pair of tail clearance openings 67B and 67C. As illustrated in FIGS. 1 and 2, locking plate 57B includes a clearance opening 67B formed in the inclined front face 58B its forward wall 61B. Locking gate 57C similarly includes tail clearance opening 67C formed through its inclined front face 58C and its forward wall 61C, respectively. Clearance opening 67C is illustrated as being slightly wider or larger than corresponding opening 67B. The function of these clearance openings will become apparent from the description below.

As mentioned, when installed in guide track 20, locking gate 57 (i.e. 57A, 57B, and 57C) is to be rotatably mounted about a transverse axis (i.e., A, A' and A'', respectively) as indicated in FIGS. 1 and 2. A biasing means 72 (illustrated as a compression spring) is provided to maintain each of the locking gates 57 in an upwardly biased mode. Preferably, biasing spring 72 is mounted below locking recess 60 of locking gate 57. To facilitate its retention in place, spring 72 may be so sized to fit about the downwardly depending conformation of recess 62.

A plurality of transversely arranged strengthening ribs 36 are illustrated as preferred structure for augmenting the rigidity and strength of guide track 20 and fastening system 15. It is contemplated that ribs 36 could comprise a length of stainless steel rod bolted, welded or otherwise secured in place adjacent bottom plate 35 and between channels 24 and 26. Strengthening ribs 36 can also help provide containment structure for biasing spring 72 when located adjacent thereto, as illustrated.

While it is contemplated that each of the separate locking gates 57A–C can be depressed (or rotated in a clockwise direction as shown in FIG. 2) independently of one another, it is also preferred that a release means 76 be provided for selectively disengaging all of the locking gates simultaneously to permit longitudinal movement of an emergency cot for removal and use..

FIG. 3 illustrates details of a preferred release or disengaging means 76, which preferably includes a plurality of release members 78 (78A–C) connected to respective locking gates 57A, 57B, and 57C by rotatable release bolts 79 (shown as 79A, 79B, and 79C) attached to the respective release openings 74 of the locking gates. As such, it can be seen that each of the triangular release members 78A–C are directly connected to the respective locking gates 57A–C via bolt or bushing connections (e.g. 70 and 79) connected to pivot support tang 69 and release opening 74 (see FIG. 6), respectively.

At the lower end of triangular release member 78, a longitudinal release bar 81 is attached via a rotatable release bushing (e.g. bushings 80A, 80B, and 80C). An actuation lever 82 enables a user of the fastening system 15 to pull upwardly with a single lever to simultaneously release all of the locking gates at once. Particularly, as can be understood, upward movement of lever 82 imparts rotational movement of release member 78A about pin 70 and its transverse axis A, causing a clockwise rotation of release member 78A thereabout.

Clockwise rotational movement of member 78A in turn causes the lower portion of release member 78A to move release bar 81 in a direction toward front-end 21 of guide track 20 and slightly upwardly. This longitudinal forward movement of release bar 81 simultaneously rotatably displaces release member 78B and 78C in a similar forward direction, causing them to rotate about their own pivot axes A' and A''. Rotational movement of release members 78A–C causes a likewise clockwise rotation of locking gates 57A–C, thereby moving each to their release or unlocked condition. Release of upward force on lever 82 allows the biasing springs 72 to return locking gates 57A–C and their connected Lever 82 and its linkage to locking gates 57A–C enables initiation of release procedures from the front end 21 of system 15. Such remote release of the locking gates also allows easy operation of the system by a single operator.

It should also be noted that longitudinal release bar 81 includes slotted connections 83 and 84 adjacent respective release bushings 80B and 80C. As will be understood, elongate slots 83 and 84 enable locking gates 57B and 57C to operate independently of each other and of locking gate 57A when those locking gates are being depressed by hold-down supports of a wheeled device during insertion procedures. Because the slots extend only toward the front of guide track 20, they do not inhibit the ability of release means 76 to simultaneously rotate all of the locking gates to release position as described.

FIGS. 4 and 5 illustrate the front and rear portions of a wheeled device 88 contemplated for being secured within guide track 20. Particularly, wheeled device 88 may be a cot device comprising a set of front loading wheels 90 attached to a wheel support 91, and a main or upper support frame 93 thereabove. It is also contemplated that wheeled device 88 will generally further include a rear fold-down wheel assembly (not shown) to facilitate rolling of device or cot 88 to and between an emergency vehicle and a remote area. A front hold-down support 94 is illustrated as including a substantially vertical support 95 having a retainer 96 adjacent its distal end. Retainer 96 is shown as including an outwardly extending flange 100. Hold-down 94 is further illustrated as including a rearwardly extending tail 102.

Figure 7:
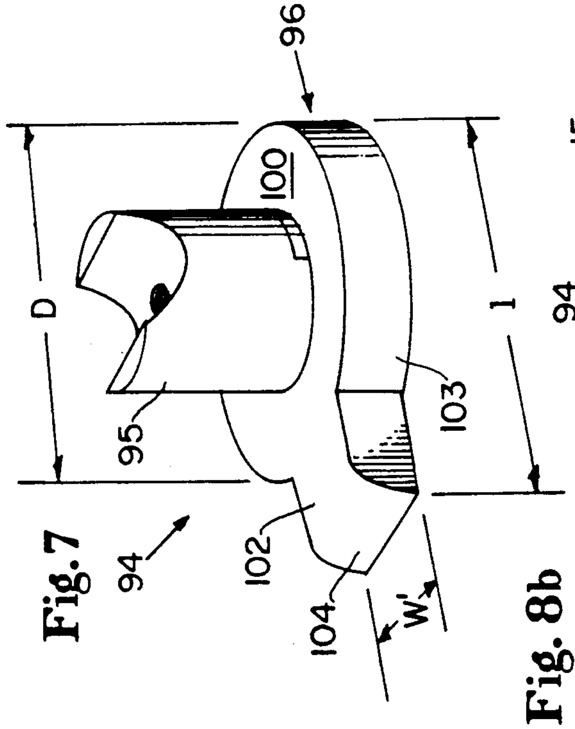
FIG. 7 is a partial perspective view of a preferred hold-down support, illustrated as including an extension tail.

As best illustrated in FIGS. 4 and 7, front retainer 96 includes an outwardly extending flange 100 having an effective diameter D, and from which extends the tail 102 such that retainer 96 has an effective length 1 as illustrated. Extension tail 102 is also illustrated as having a predetermined width w and a slightly curved edge 104.

Figure 8B:
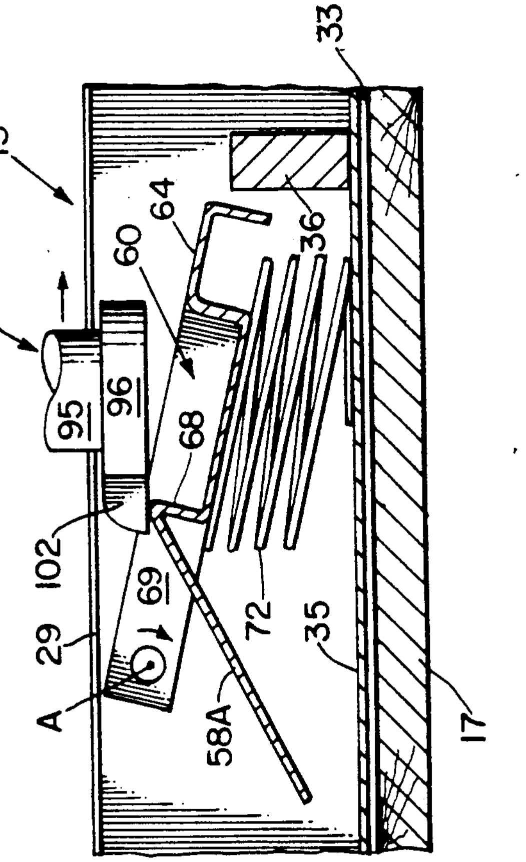
FIGS. 8*a* and 8*b* are partial cross-sectional views of a portion of a locking assembly made in accordance with the present invention and illustrating the interaction of a hold-down support and a locking gate as the support is inserted into the guide track.
Figure 8A:
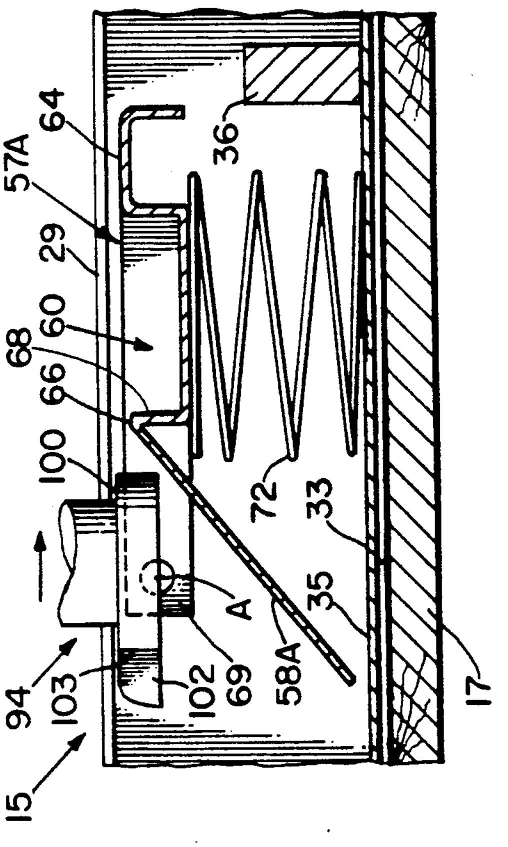

In use, front loading wheels 90 will be first placed on planar surface 17 to facilitate insertion of wheeled device 88 into an emergency vehicle such as shown in FIG. 1. The attachment of hold-down support 94, and the length of support column 95 will be designed to support retainer 96 at a predetermined level or height H, which will enable retainer 96 and its outwardly extending flange 100 to be received within guide track 20 and its receiving means or slot 27, as best seen in FIGS. 7 and 8*a* and 8*b*. Particularly, insertion apron 45 will facilitate preliminary alignment of hold-down support 94 and help guide it into slot 27.

As wheeled device 88 is further inserted into rear portions 16 of an emergency vehicle, the front edge of flange 100 will encounter inclined front face 58 of a locking gate (e.g. 57A), as shown in FIG. 8*a*. As hold-down support 94 interfaces with inclined surface 58, locking gate 57A will be rotated about transverse axis A in a clockwise direction such that upper contact shoulder 66 is rotated downwardly to enable passage of support 94 thereover. The effective diameter D of retainer 96 will generally be slightly smaller than length L of locking recess 60 of a locking gate 57. Consequently, locking gate 57 will generally snap upwardly into locking condition once the rear edge 103 of flange 100 is displaced past contact shoulder 66 and forward wall 68. As best seen in FIG. 8*b*, however, extension tail 102 maintains downward depression interference with contact shoulder 66 until the front edge of flange 100 passes above panel 64 of locking gate 57, thereby preventing the upward return of locking gate 57 to its upward or locked condition.

As mentioned above, the length 1 of extension tail 102 is designed to enable hold-down support 94 and its retainer 96 to slidably pass over one or more locking gates 57 arranged along the length of guide track 20. It has also been mentioned that second locking gate 57B will preferably be provided with a tail clearance opening 67B having a predetermined width W, as shown in FIGS. 1, la, 2 and 6. If it is desired to enable retainer 96 to pass over second locking gate 57B without locking therewithin, the width w of extension tail 102 must be slightly larger than width W of locking gate 57B. In such case, extension tail 102 will interfere with the return of locking gate 57B to its upward or locked condition as retainer 96 is passed thereover. Consequently, locking gate 57B would remain in its depressed or released condition until pud 96 passed thereover.

Assuming it is desired that retainer 96 be locked within locking gate 57C, then extension tail 102 will be provided with a width w which is less than the width W′ of locking gate 57C so that when rear edge 103 of flange 100 passes over contact shoulder 66C, locking gate 57C will automatically snap upwardly and return to its locked condition, lockingly interacting with and holding retainer 96 therewithin. Such a locked condition is illustrated in FIG. 9, wherein extension tail 102 is shown as being received within clearance opening 67C of gate 57C.

Figure 9:
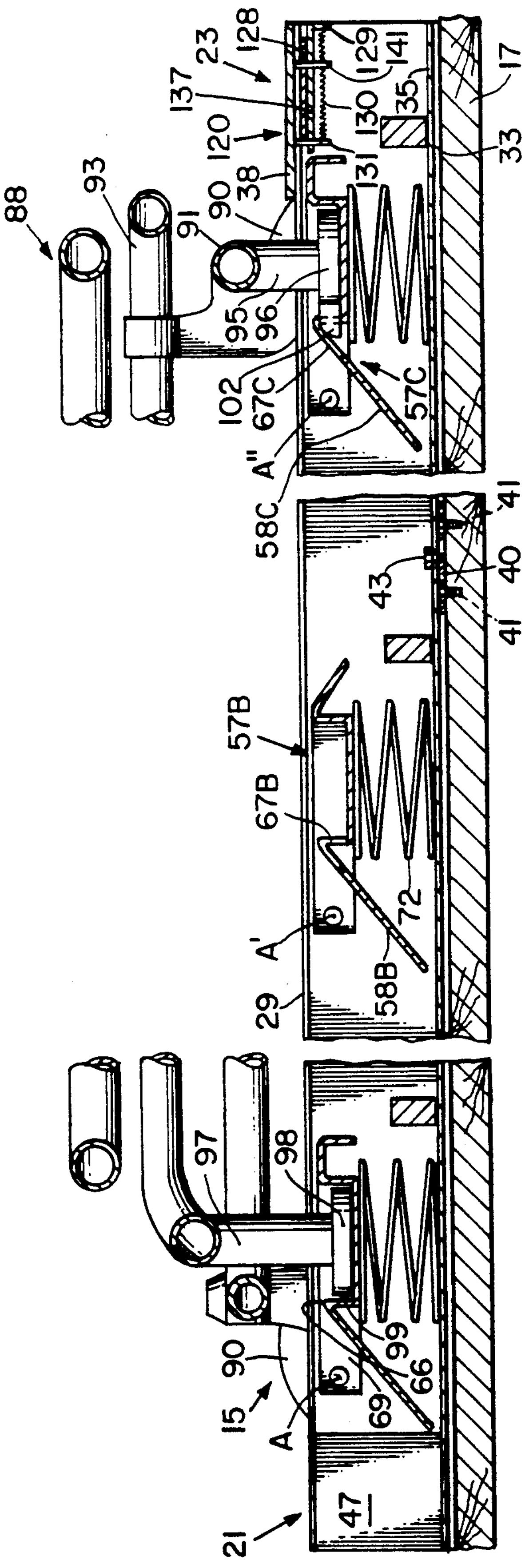
FIG. 9 is a partial cross-sectional view similar to that shown in FIG. 2 and illustrating the fastening system of the present invention in locked condition.

The rear end portions of wheeled device 88 are illustrated in FIGS. 5 and 9, wherein a second or rear hold-down support 97 is illustrated as including a retainer 98. As best seen in FIG. 9, it is preferred that rear retainer 98 not include an extension tail, so that when rear edge of retainer 98 passes beyond contact shoulder 66, locking gate 57A will snap upwardly into locking condition as illustrated. With retainer 96 located within gate 57C, and retainer 98 locked within gate 57A, wheeled device 88 will be secured at a predetermined position along track 20 and restrained from further longitudinal movement therealong.

When it is desired to remove wheeled device 88 from its locked condition illustrated in FIG. 9, release lever 82 is moved upwardly, thereby rotating locking gates 57A–C into their release or unlocked condition, and enabling rearward longitudinal movement of wheeled device 88 along track 20. It will be understood that once rearward movement of wheeled device 88 is initiated, upward force on release lever 81 can be ceased. As wheeled device 88 is removed from guide track 20, extension tail 102 will interface with panels 64 (e.g. 64B and 64A) to initiate rotation of locking gates 57B and 57A, respectively, into release condition and enabling retainer 96 to pass thereover for removal. Panel 64B is illustrated as having an angled orientation to facilitate unlocking interaction with tail 102.

It should be noted that the use of an extension tail 102 in conjunction with custom-sized tail clearance openings (e.g. 67B and 67C) is a preferred manner of insuring that fastening system 15 will provide locking and unlocking capabilities with a variety of wheeled devices having retainers of predetermined structural conformation (i.e. size and/or shape). This selective interaction could also be provided by utilizing retainers of varying effective diameters (e.g. D) in conjunction with locking gates having corresponding lengths L of locking recess 60, as appropriate. It should be understood that in the embodiment described above, a second and different model of a wheeled device (e.q. a shorter model or one having its front support located closer to the rear support) could be provided with a retainer having an extension tail with a width w slightly smaller than the width W of locking gate 57B to enable automatic locking of such retainer within gate 57B. In this way, it can be seen that particular models of wheeled devices can be provided with retainers of predetermined structural conformation to lockingly engage only with correspondingly designed locking gates, and to automatically accommodate cots and devices of varying styles and lengths.

Any number of locking gates can be provided along guide track 20, and the resulting fastening system 15 will automatically receive and properly secure in place a wide variety of wheeled devices accordingly. By keying locking gates to particular structural conformations of retainers, a reliable system for automatically accepting and locking a wide variety of devices can be provided by a single guide track 20 which needs no further modification or adjustment in use. Additionally, the locking and release procedures of the fastening system will function in an unchanged manner regardless of the type or model of device locked therewithin, so long as the hold-down supports and retainers are made in accordance with the principles described herein.

Figure 10:
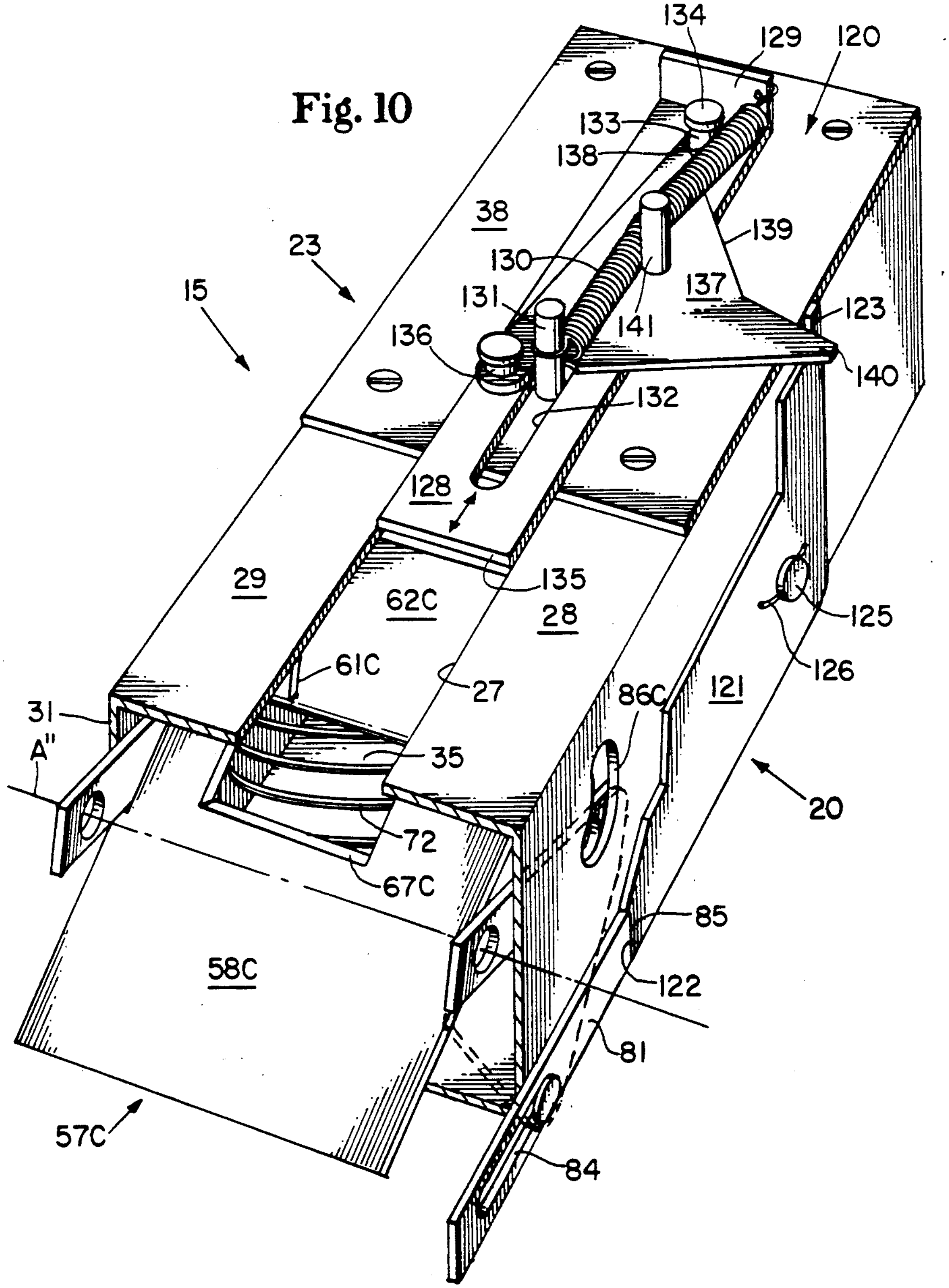
FIG. 10 is a partial cross-sectional view of the rear end of a preferred fastening system of the present invention, illustrating details of portions of a particular release assembly in unlocked condition.
Figure 11:
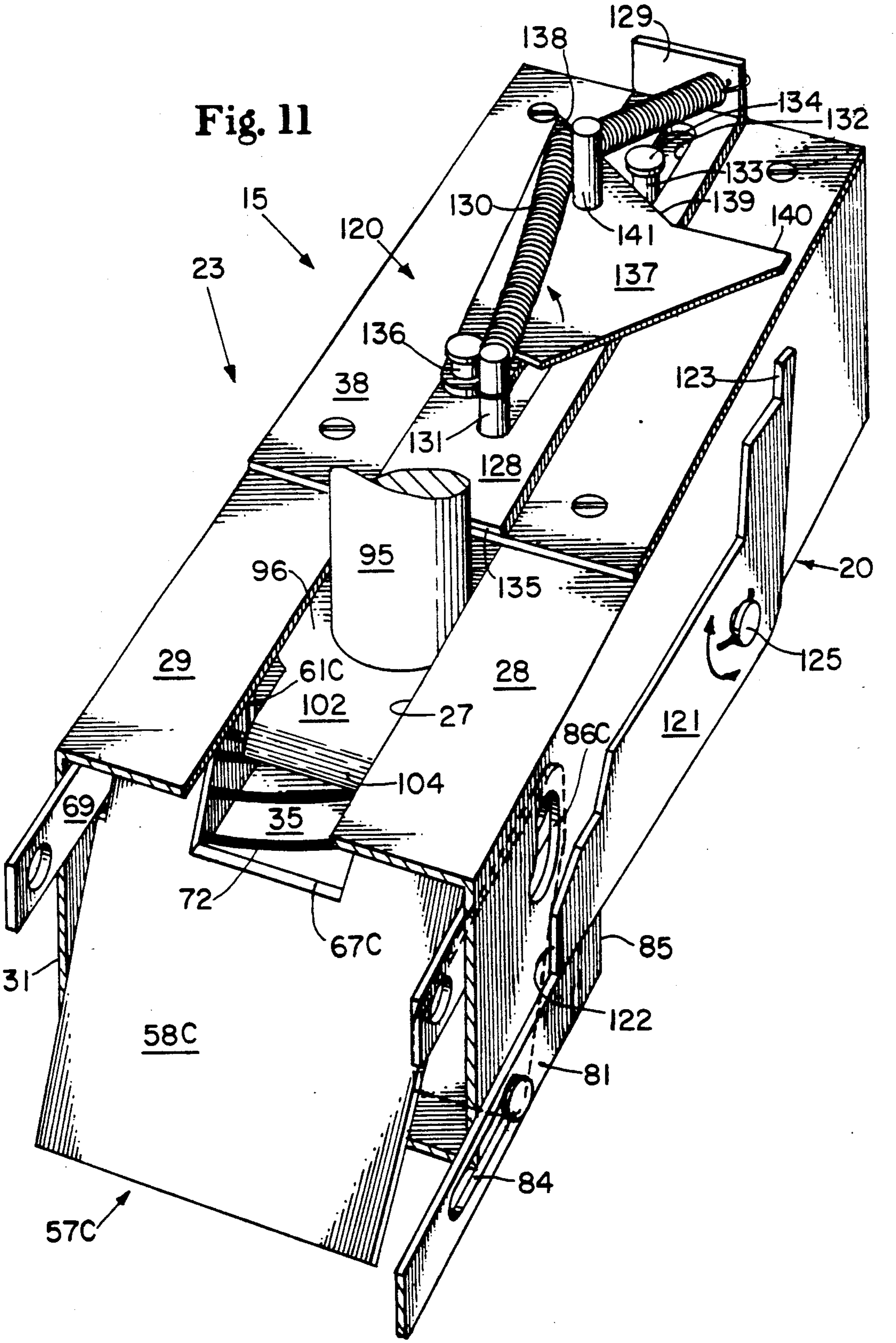
FIG. 11 is a partial cross-sectional view of the rear end of the fastening system shown in FIG. 10, shown in locked condition.

FIGS. 10 and 11 illustrate partial cross-sectional views of the rear-end 23 of a fastening system 15 made in accordance herewith. These figures further show details of a preferred means 120 for maintaining the fastening system in released condition to facilitate removal procedures. Particularly, located adjacent the distal edge 85 of release bar 81 is a detent arm 121 having a front edge 122 designed to correspond with distal edge 85 for selective face to face contact in the unlocked condition, as shown in FIG. 10. Detent arm 121 is rotatably connected via pivot pin 125 to longitudinal guide track 20, and can be rotatably biased to its unlocked condition shown in FIG. 10, such as by a spring 126. Detent arm 121 further includes an upwardly extending stop 123 which extends above stop plate 38 in unlocked condition.

Slidably mounted relative to stop plate 38 is reciprocating plate 128 having a front or actuation edge 135, and an upwardly extending flange 129 adjacent its rear edge. A longitudinal slot 132 is provided to slidably guide plate 128 longitudinally along stop plate 38. A front pin 131 extends upwardly from stop plate 38 through slot 132, while a second standard or pin 133 having a retainer head 134 similarly extends upwardly from plate 38. Pins 131 and 133 provide a pair of spaced guide supports along which reciprocating plate 128 can be moved. Reciprocating plate 128 is biased in a direction toward the front end 21 of guide track 20 by an extension spring 130 anchored to front pin 131 and flange 129.

Rotatably attached to the upper surface of reciprocating plate 128 is release lock plate 137, which comprises a generally triangular conformation rotatably attached to plate 128 adjacent its forward apex via a pivot pin 136. Release lock plate 137 includes an angular guide edge 139 extending generally between a retention tip 138 and an extension 140. A biasing protuberance 141 interacts with extension spring 130 to generally bias guide edge 139 of plate 137 against standard 133.

FIG. 10 illustrates release lock assembly 120 in an unlocked condition, wherein detent arm 121 is rotated into contacting engagement between its front edge 122 and release bar end 85. In such condition, release bar 81 is maintained in its forwardmost or released (unlocked) condition, and interacts with each of the triangular release members 78A–C to maintain them in a clockwise rotated position, whereby each of the locking gates 57A–C will also be rotated to their unlocked condition. Locking gate 57C is illustrated in FIG. 10 in its unlocked, clockwise rotated condition. This unlocked condition allows easy withdrawal of retainer 96 from locking gate 57C, and maintenance of all gates 57 in unlocked condition allows complete withdrawal of a wheeled device (e.g., 88) from fastening system 15. Release lock assembly 120 serves to maintain locking gates 57A–C in their unlocked condition (e.g., as shown in FIGS. 10 and 8*b*) until detent arm 121 is rotated into locked condition, as illustrated in FIG. 11.

FIG. 11 illustrates what happens when a wheeled device 88 is properly inserted into fastening system 15. Particularly, as retainer 96 and its downwardly depending support 95 are pushed rearwardly within guide track 20, support 95 will contact actuation edge 135 of reciprocating plate 128, forcing it rearwardly. Rearward movement of plate 128 similarly carries release lock plate 137 in a rearward direction, causing extension 140 to contact upwardly extending stop 123. Further movement of extension 140 causes corresponding rearward movement of stop 123, resulting in clockwise movement of detent arm 121 and, in turn, rotation of front edge 122 out of contact with release bar end 85. Once end 85 loses contact with front edge 122, it is no longer restrained, and the upward bias caused by the compression springs 72 will cause each of the locking gates 57A–C to be moved in an upward direction toward their locked condition.

Accordingly, once release bar 85 is no longer restrained in a forward direction by detent arm 121, locking gates 57A–C are free to lockingly interact with a retainer as described above. As can be understood, release lock assembly 120 thereby enables manual control over all of the locking gates simultaneously, and can be advantageous in simplifying removal procedures. The particular structural details of release lock assembly 120 are set forth herein only as a preferred example, and can be modified and substituted without departing from the scope of this invention.

Particularly, the embodiments of FIGS. 3 and 9 illustrate an arrangement wherein release lock assembly 120 might be installed with its reciprocating plate (e.g., 128), release lock plate (e.g., 137) and its guide pin and spring biasing arrangement (e.g., 131, 133, 141, and 130) located within guide track 20 and below stop plate 38. This internal mounting of the release lock assembly 120 may be preferred to isolate moving parts of the system for safety reasons, to protect the moving parts from dirt and grime, or for aesthetic reasons. In such an installation, it is contemplated that extension 140 might extend outwardly through side wall 30 through a longitudinal slot 143, as indicated in FIG. 3.

It is also contemplated herein that other means for receiving the hold-down supports of devices to be secured could be equally substituted for the slot 27 described above. Particularly, a pair of oppositely disposed rails might be provided along which a rolling clamp structure for receiving a hold down support might be selectively attached as a substitute for the slot 27 described above. While other mechanisms could also be designed to substitute for the slot arrangement, it is believed that any such alternative would require additional moving parts and pieces unnecessarily complicating the design of the present invention.

Having shown and described the preferred embodiments of the present inventions, further adaptions of the fastening system for cots and similar devices described herein can be accomplished by appropriate modifications by one of ordinary skill in the art without departing from the scope of the present invention. Several of such potential modifications have been mentioned, and others will be apparent to those skilled in the art.

For example, anchor plates 40 might be provided with a plurality of attachment locations for thumbscrew retainers 43 to enable limited lateral adjustment of guide track 20 as desired. Additionally, anchor plate 40 might include its own channel and slot arrangement to enable lateral adjustability of thumbscrew retainers 43 and track 20, or movement of a wheeled device even after it has been secured within guide track 20. Such an arrangement would enable limited lateral adjustment of guide track 20 and a fastened cot in use, without forfeiting the improved vertical and front-to-rear retaining characteristics of the presen invention.

Another alternative might utilize the guide track and front hold-down support as shown and described, but incorporate an independent clamp arrangement for the rear of the cot. Such clamp arrangement might include a rear fastening rail as available in the industry, or a similar clamping structure, another connected to the guide track or not.

Accordingly, the scope of the present invention should be considered in terms of the following claims and is understood not to be limited to the details of structure and operation shown and described in the specification and drawings.

We claim:

1. A fastening system for cots and similar devices having a support frame to be secured along a substantially planar surface, said fastening system comprising:

a longitudinal guide track to be mounted upon said substantially planar surface, said track having front and rear ends;

at least one hold-down support attached to said support frame to be secured and depending downwardly from said frame toward said planar surface in use;

means for receiving said support along said track, said receiving means permitting longitudinal movement of said support along said track and preventing substantial vertical movement therebetween;

locking means for securing said support frame at a predetermined longitudinal position along said track and preventing further longitudinal movement therealong, said locking means comprising a plurality of locking gates spaced along said guide track and designed to lockingly engage only with supports of predetermined structural conformation, whereby each locking gate is selectively lockable only with certain supports to the exclusion of others; and release means for selectively disengaging said locking means to permit longitudinal movement of said support along said track.

2. The fastening system of claim 1, further comprising a pair of spaced apart supports depending downwardly from said support frame.

3. The fastening system of claim 1, wherein said support further comprises a retainer designed to be slidably received by said track.

4. The fastening system of claim 3, wherein said means for receiving said support comprises a longitudinal slot along said track, and wherein said retainer comprises an outwardly extending flange adjacent to the distla end of said support, said support extending through said slot and said flange preventing vertical withdrawal of said support thereform while permitting longitudinal movement of said support therealong.

5. A fastening system for securing cots and similar wheeled devices along a substantial planar surface, said fastening system comprising:

a wheeled device having a support frame;

spaced apart front and rear hold-down supports depending downwardly from said frame toward said planar surface in use;

a longitudinal guide track to be mounted upon said substantially planar surface, said track having a front end and a rear end;

means for receiving said supports along said guide track, said receiving means permitting longitudinal movement of said supports along said track and preventing substantial vertical or lateral movement therebetween;

locking means associated with said track for securing said support frame at a predetermined longitudinal position along said track, and preventing further longitudinal movement therealong, said locking means comprising a plurality of locking gates spaced along said guide track and designed to lockingly engage only with supports of predetermined structural conformation, whereby each locking gate is selectively lockable only with certain supports to the exclusion of others; and release means for selectively disengaging said locking means to permit longitudinal movement of said supports along said track.

6. The fastening system of claim 5, wherein said means for receiving said supports comprises a longitudinal slot extending along a substantial portion of said track, and wherein said supports each further comprise a retainer having an outwardly extending flange adjacent the distal end of said support, said support extending through said slot and said flange preventing vertical withdrawal of said support therefrom while permitting longitudinal movement of said support therealong.

7. A fastening system for securing wheeled patient transfer devices along a substantially planar surface, such as the floor of an emergency vehicle, said fastening system comprising:

a patient transfer device having a support frame;

spaced apart front and rear hold-down supports depending downwardly from said frame toward said planar surface in use, said hold-down supports each further comprising a retainer having an outwardly extending flange;

a longitudinal guide track to be attached adjacent said planar surface, said track having top and bottom surfaces and front and rear ends, and a slot formed along said top surface for slidably receiving said supports and permitting longitudinal movement of said supports along said track, and said slot interfacing with said flange of a support received in said track to prevent vertical withdrawal of said support;

locking means associated with said track for securing said support frame at a predetemrined longitudinal position along said track, said locking means comprising a plurality of locking gates spaced along said guide track and designed to lockingly engage only with supports of predetermined structural conformation, whereby each locking gate is selectively lockable only with certain supports to the exclusion of others; and release means for selectively disengaging said locking means to permit longitudinal movement of said supports along said track.

8. The fastening system of claim 7, wherein said locking means further comprises a plurality of spaced apart locking gates designed to selectively and automatically lockingly engage only with retainers of predetermined structural conformation, whereby only retainers having corresponding structural conformation shall be lockingly engaged by any particular gate.

9. The fastening system of claim 8, wherein said plurality of locking gates are spaced at predetermined points along said guide track in order to automatically lockingly engage with retainers of particular models of patient transfer devices, whereby different models of patient transfer devices can be substituted for use with any particular guide track, with those different models being automatically secured at selected predetermined positions along said track depending upon the structural conformation of the retainers of each such device, without modification or adjustment of said fastening system.

10. A fastening system for cots and similar devices having a support frame to be secured along a substantially planar surface, said fastening system comprising:

a longitudinal guide track to be mounted upon said substantially planar surface, said track having front and rear ends;

a pair of spaced apart hold-down supports attached to said support frame to be secured and depending downwardly from said frame toward said planar surface in use, wherein said supports each further comprise a retainer designed to be slidably received by said track;

means for receiving said supports along said track, said receiving means permitting longitudinal movement of said supports along said track and preventing substantial vertical movement therebetween;

locking means for securing said support frame at a predetermined longitudinal position along said track and preventing further longitudinal mvoement therealong, said locking means further comprising a plurality of locking gates spaced along said guide track and which receive and selectively lockingly interact with at least one of said supports, said locking gates designed to lockingly engage only with retainers of predetermined structural conformation, whereby said locking gates are selectively lockable only with certain retainers to the exclusino of others; and release means for selectively disengaging said locking means to permit longitudinal movement of said supports along said track.

11. The fastening system of claim 10, wherein at least one of said retainers further comprises an extension tail extending laterally outwardly to interact with at least one of said gates to prevent locking engagement of said retainer with such gate.

12. A fastening system for cots adn similar devices having a support frame to be secured along a substantially planar surface, said fastening system comprising:

a longitudinal guide track to be mounted upon said substantially planar surface, said track having front and rear ends;

a pair of spaced apart supports attached to said support frame to be secured and depending downwardly from said frame toward said planar surface in use;

means for receiving said supports along said track, said receiving means permitting longitudinal movement of said supports along said track and preventing substantial vertical movement therebetween;

locking means for securing said support frame at a predetermined longitudinal position along said track and preventing further longitudinal mvoement therealong, said locking means further comprising a plurality of locking gates spaced along said guide track and which receive and selectively interact with said supports, wherein each locking gate is individually engageable with at least one of said supports; and release means for selectively disengaging said locking means and further comprising means for simultaneously disengaging all of said gates from said supports to enable longitudinal movement of said support frame relative to said track.

13. The fastening system of claim 12, further comprising means for simultaneously maintaining a plurality of said gates in unlocked condition to facilitate removal procedures.

14. A fastening system for securing cots and similar wheeled devices along a substantial planar surface, said fastening system comprising:

a wheeled device having a support frame;

spaced apart front and rear hold-down supports depending downwardly from said frame toward said planar surface in use, wherein said supports each further comprise a retainer having an outwardly extending flange adjacent the distal end of said support;

a longitudinal guide track to be mounted upon said substantially planar surface, said track having a front end and a rear end;

means for receiving said supports along said guide track, said receiving means permitting longitudinal movement of said supports along said track and preventing substantial vertical or lateral movement therebetween;

locking means associated with said track for securing said support frame at a predetermined longitudinal position along said track, and preventing further longitudinal movement therealong, said locking means comprising a plurality of locking gates spaced along said guide track and which receive and selectively lockingly interact with at least one of said supports, and wherein said gates are designed to lockingly engage only with retainers of predetermined structural conformation, whereby said locking gates are selectively lockable only with certain retainers to the exclusion of others; and release means for selectively disengaging said locking means to permit longitudinal movement of said supports along said track.

15. The fastening system of claim 14, wherein at least one of said retainers further comprises an extension tail extending laterally outwardly to interact with at least one of said gates to prevent locking engagement of said retainer with such gate.

16. A fastening system for securing cots and similar wheeled devices along a substantial planar surface, said fastening system comprising:

a wheeled device having a support frame;

spaced apart front and rear hold-down supports depending downwardly from said frame toward said planar surface in use;

a longitudinal guide track to be mounted upon said substantially planar surface, said track having a front end and a rear end;

means for receiving said supports along said guide track, said receiving means permitting longitudinal movement of said supports along said track and preventing substantial vertical or lateral movement therebetween;

locking means associated with said track for securing said support frame at a predetermined longitudinal position along said track, and preventing further longitudinal movement therealong, said locking means comprising a plurality of locking gates spaced along said guide track and which receive and selectively lockingly interact with said supports, wherein each locking gate is individually engageable with at least one of said supports;

release means for selectively disengaging said locking means; and means for simultaneously disengaging a plurality of said gates from said supports to enable longitudinal movement of said support frame relative to said track.

17. The fastening system of claim 16, wherein said means for simultaneously disengaging said gates comprises a mechanical linkage assembly connected along said track to each of said gates.

18. A fastening system for securing cots and similar wheeled devices along a substantial planar surface, said fastening system comprising:

a wheeled device having a support frame;

spaced apart front and rear hold-down supports depending downwardly from said frame toward said planar surface in use;

a longitudinal guide track to be mounted upon said substantially planar surface, said track having a front end and a rear end;

means for receiving said supports along said guide track, said receiving means permitting longitudinal movement of said supports along said track and preventing substantial vertical or lateral movement therebetween;

locking means associated with said track for securing said support frame at a predetermined longitudinal position along said track, and preventing further longitudinal movement therealong, said locking means comprising a plurality of locking gates spaced along said guide track and which receive and selectively lockingly interact with said supports;

release means for selectively disengaging said locking means to permit longitudinal movement of said supports along said track; and a front locking gate adjacent said front end of said track and a release lever, said front gate being designed to prevent withdrawal of said front hold-down support from said system unless the release lever is activated.

* * * * *